Feb. 10, 1959 R. S. SENNETT 2,873,346
SEALING MACHINE
Filed March 8, 1957

INVENTOR
ROY SIDNEY SENNETT

BY
AGENT

United States Patent Office 2,873,346
Patented Feb. 10, 1959

2,873,346

SEALING MACHINE

Roy Sidney Sennett, Toronto, Ontario, Canada, assignor to North American Philips Co., Inc., New York, N. Y.

Application March 8, 1957, Serial No. 644,820

Claims priority, application Canada December 4, 1956

9 Claims. (Cl. 219—10.53)

This invention relates to a sealing head for an indexing machine wherein the sealing head is particularly adapted for the sealing of miniaturized electronic components in containers of very small dimensions.

In the sealing of containers for miniaturized electronic components such as transistors or frequency controlling crystals, it is necessary to reduce the heat that reaches the component during the sealing operation to a minimum. A method of sealing which fulfills this requirement is described in Canadian patent application Serial No. 713,653, filed August 28, 1956, assigned to the assignee of the present invention. The present invention concerns apparatus suitable for carrying out the above-mentioned sealing method.

As described in the above-mentioned Canadian application, the enclosure for the electronic component comprises a base having connection pins extending through it, the component being mounted on the pin extensions. A cap or bulb of suitable dimensions is placed over the electronic component and secured to the base through the medium of a metal ring heated by high frequency currents. It is to be understood that the cap and base are of a heat fusible material such as glass.

The sealing head of the present invention comprises a base member which may be secured in place on a rotating indexing type machine. A main support pin is secured to the base member at one of its ends. A cup-shaped bulb holder having good heat conducting properties is secured by means of a hinged connection to the free end of the support pin. The cup-shaped member is adapted to hold the cap of the enclosure unit while providing for leaving the sealing edge accessible. A cylindrical member surrounds the support pin and is biased toward the base of the sealing head by means of a spring inserted between the cylindrical member and the support pin. The cylindrical member supports a base locating plate at its end remote from the base member. The locating plate has pin receiving holes drilled therethrough which receive the pins of the base of the enclosure unit and maintains proper alignment prior to the sealing operation. When the base and cap are in position in the sealing head, the spring bias on the cylindrical member is effective to press the cap and the base together to facilitate the sealing operation. A metal ring is preferably secured to one of the enclosure members prior to its being mounted in the sealing head.

A portion of the upper end of the cylindrical member is cut away to enable the cup-shaped bulb holder to be tilted outward from its hinged support. A pin secured to the cup-shaped member engaged with the end of a slot in the cylindrical member to effect the tilting of the cup-shaped member when the cylindrical member is moved away from the base and against the spring bias. Additional spring means are employed to maintain contact between the pin and the cylindrical member.

The sealing head is provided with bell jar evacuation means in order that the enclosure unit may be evacuated in position in the head, prior to the actual sealing process. An energized high frequency heating coil preferably surrounds the bell jar and head to effect the seal.

My invention will now be described with reference to the figures of the drawing in which.

Figure 2:
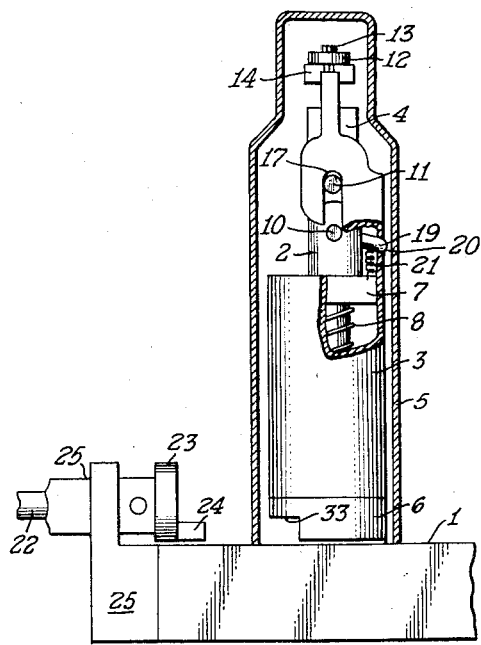
Fig. 2 shows a cutaway view of the head disclosing further details.
Figure 1:
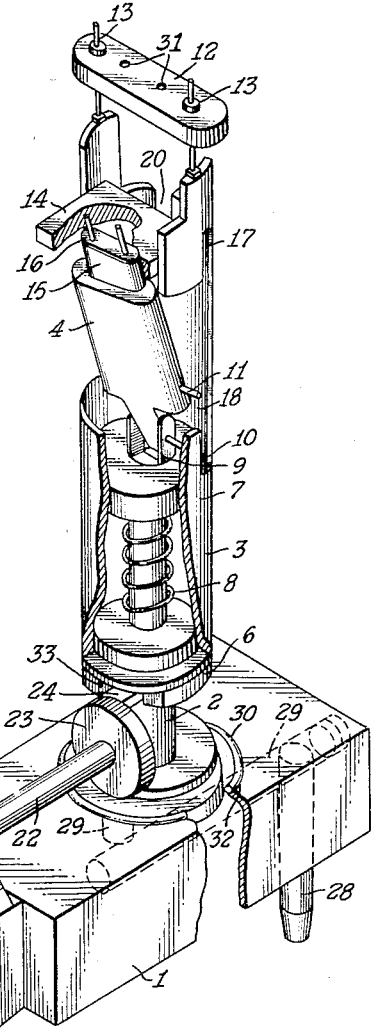
Figure 1 shows a perspective view of the sealing head with a cutaway showing some of the internal constructional details.

Referring nows to Figs. 1 and 2, the sealing head is shown as being mounted on a base member 1 which may be secured to an indexing type machine. Secured to base 1 is an upright support pin 2 having its upper end shaped to form one part 9 of a hinge or movable joint. The other part of the hinge is constituted by a cup-shaped bulb holder 4 hinged to support pin 2 by means of a pin 10. The cup-shaped member is adapted to hold the cap of the electronic component enclosure 15 shown therein and is preferably of a metal such as copper, having good heat conducting properties.

A cylindrically or tubular shaped member 3 surrounds the support pin 2 and is biased toward the base end thereof by means of a compressed spring 8 shown most clearly in the cut away view of Fig. 1. A centering collar 6 movable along pin 2 is secured to the base end of member 3. A collar 7 is secured to pin 2 by set screw or other suitable means so that spring 8 is compressed between collars 7 and 6 to bias member 3 towards the base. The upper end of member 3 supports a ceramic (non-conducting) location plate 12 by means of extending bolts 13. Holes 31 are adapted to accept the pins of a base 16 of the electronic component enclosure unit in order to maintain proper alignment between the base and cap during the sealing operation. A portion of member 3 is cut away to allow bulb holder 4 to be tilted out to the position as shown in Fig. 1. A pin 19 (Fig. 2) is secured to bulb holder 4 and is at right angles to hinge pin 10. Pin 19 protrudes through a vertical slot 20 in member 3 and is biased to contact the bottom of the slot by a tensioned coil spring 21 when bulb holder 4 is in the position shown in Fig. 1. The cap or bulb portion 15 of the enclosure unit is placed in inverted position in bulb holder 4. The base 16 is placed in position on cap 15. The base preferably has a metal ring secured thereto in position and of such size as to be in contact with the rim of cap 15. The metal ring may be fused in position in a groove provided on base 16 to maintain it prior to fusion of the base to the cap of the enclosure. A cup shaped retaining piece 14, preferably of ceramic material, is positioned over base 16 and cap 15 to maintain the desired alignment and required dimensions during the sealing operation.

Shaft 22 is now rotated to allow member 3 to move back to its position adjacent base member 1. As member 3 moves back, spring 21 rotates bulb holder 4 about pin 10 until pins 11, only one of which is shown, contact the edge of slots 18 provided in member 3 which thereafter holds bulb holder 4 in axial alignment with support pin 2. Further movement of member 3 causes the pins of base 16 to enter holes 31 provided in location plate 12. Member 3 is so dimensioned with respect to support pin 2 that collar 6 does not contact base member 1 when a cap and base are inserted for sealing. In this manner pressure is applied across the sealing surfaces by means of compression spring 8 to provide a reliable seal.

The bell jar is now positioned over the sealing head and evacuated. Bake-out means may be provided if necessary, precautions being taken to prevent overheating of the electronic component. When sufficient time has elapsed to provide for the degree of vacuum required in the finished component which may be provided for in the index timing of the machine, a high frequency heating coil preferably employing a field concentrator is placed over the small portion of the top of bell jar 5 and energized to effect the seal. As indicated previously, a gaseous atmosphere may be admitted to the bell jar prior to the sealing operation.

Although a preferred embodiment of my invention has been described, it will be obvious to those skilled in the art that modifications may be made which do not depart from the spirit and scope thereof, which I intend to cover by the appended claims.

The embodiments of the invention in which an exclusive property or privilege is claimed are defined as follows:

1. A sealing head adapted for the sealing of two fusible parts through the medium of a metal ring heated by high frequency currents comprising a centre post having one end secured to a base support, a cup-shaped member of good heat conducting material adapted to hold one of said parts and hinged at its closed end to the free end of said centre post, a movable tubular member surrounding said centre post and spring biased towards said base support, pin means secured to said cup-shaped member and spring biased to contact said movable tubular member to tilt said cup-shaped member at an angle to said centre post when said movable member is displaced from said base support and a non-conducting locating member secured to the end of the tubular member remote from said base support adapted to hold the other of said two parts so that said two parts are normally pressed together by the spring biasing of said tubular member toward said base support.

2. The sealing head as claimed in claim 1 wherein a bell jar surrounds said head and contacts said base member to form a closed chamber.

3. The sealing head as claimed in claim 1 wherein a high frequency heating coil surrounds said head in the vicinity of the desired seal between said two parts.

4. In a sealing machine for effecting a cap to base seal of an enclosure through the medium of a metal ring secured to one of the enclosure members and heated by high frequency currents, a sealing head comprising a cup-shaped housing of good heat conducting properties adapted to hold said cap, said housing being hinged at its closed end to a stationary centre post, a movable external tubular member surrounding said centre post and spring biased towards the end of said post remote from said hinge, additional spring means adapted to bias said cup-shaped housing at said hinge and a pin on said cup-shaped housing cooperating with said tubular member to cause said cup-shaped housing to tilt outwards against the hinge bias to facilitate loading of a cap thereinto when said tubular member is moved against said spring bias and non-conducting locating means secured to said tubular member adapted to hold said base compressed against said cap by means of the spring biasing of said member.

5. The sealing machine as claimed in claim 4 wherein bell jar evacuation means is provided to facilitate the sealing of an evacuated enclosure.

6. The sealing machine as claimed in claim 4 wherein a high frequency heating coil surrounds the sealing head in the vicinity of the desired seal.

7. In a sealing machine adapted for the sealing of miniaturized enclosures consisting of a fusible cap and base, a sealing head comprising a centre post secured at one end to a suitable base, a heat conducting cup-shaped member, dimensioned to receive the cap of said enclosure, hinged to the other end of said post, a member surrounding said post and spring biased towards the secured end thereof, spring and stop means normally positioning said cup-shaped member in axial alignment with said centre post, non-conducting locating and dimension holding means, adapted to hold and position said base, secured to the end of said surrounding member remote from the secured end of said centre post so that the base and cap member are normally held in the position for sealing and pressed together, and means on said surrounding member engaging said cup-shaped member to tilt it out of axial alignment when said surrounding member is moved against its spring bias.

8. The sealing machine as claimed in claim 7 wherein bell jar means are provided for evacuation of the enclosures while mounted in said sealing head.

9. The sealing machine as claimed in claim 7 wherein a high frequency coil surrounds said sealing head adjacent the desired sealing area.

References Cited in the file of this patent

UNITED STATES PATENTS 2,775,068    McDuffee _____ Dec. 25, 1956